June 19, 1934.  E. E. E. MULLINS  1,963,444
REMOTE CONTROL APPARATUS FOR POWER DRIVEN BOATS AND THE LIKE
Filed Aug. 15, 1933  4 Sheets-Sheet 1

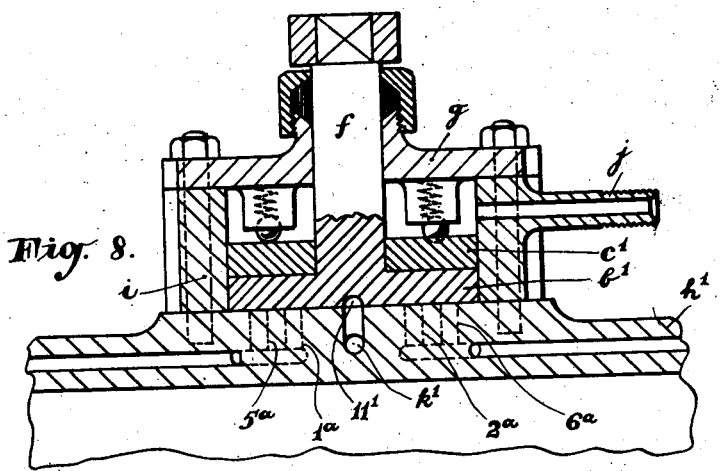
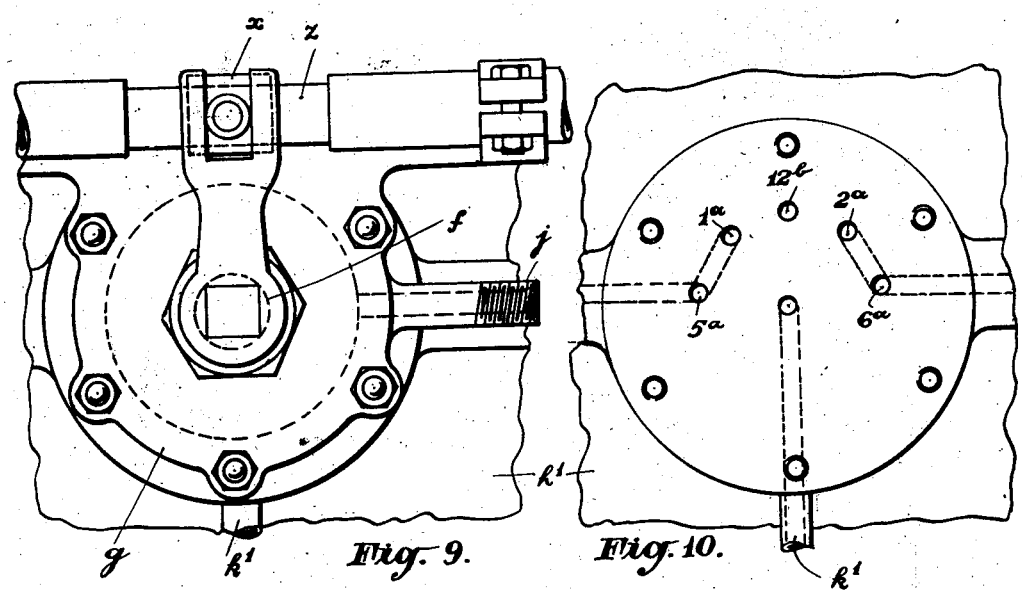
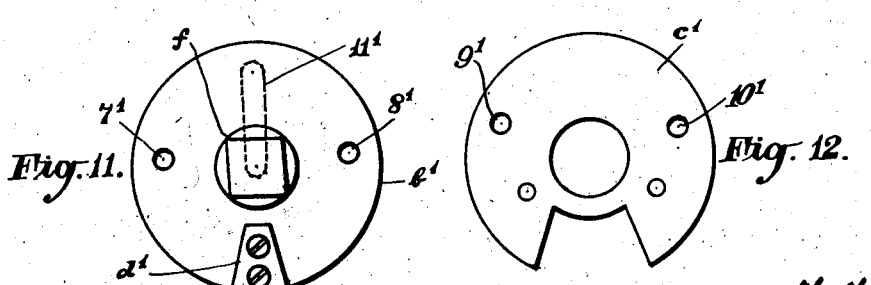

Patented June 19, 1934

1,963,444

UNITED STATES PATENT OFFICE 1,963,444

REMOTE CONTROL APPARATUS FOR POWER DRIVEN BOATS AND THE LIKE

Ernest Edgar Edward Mullins, Stockport, England

Application August 15, 1933, Serial No. 685,298
In Great Britain September 12, 1932

3 Claims. (Cl. 121—40)

This invention relates to remote control apparatus for power driven boats and the like and comprises an improvement in or modification of the apparatus set forth in my U. S. patent application, Patent No. 1,925,000, Aug. 29, 1933. In the said patent a control apparatus is described which is adapted to move a piston into three positions to control for instance "forward", "reverse" and "neutral" positions of a gear lever, and according to the present improvements an improved arrangement is provided whereby the piston can be controlled to be moved directly into any position and so that for instance it will not be necessary to first move and retain the piston in neutral or central position when changing direct from forward to reverse or reverse to forward. For this purpose the ports controlling the outlet and inlet are so arranged that the piston can be moved the full length of the cylinder by the force applied at each end, without utilizing a central port as described in my said prior patent. According to the present improvements also, means are provided for locking the gear lever in any position to which it has been moved.

Referring to the drawings.

Figure 8 is a central vertical section of a modified form of valve mechanism.

Figure 9 is a plan view of Figure 8.

Figure 10 is a plan view of the valve seating on the piston cylinder, shown by Figure 8.

Figure 11 is a plan view of the valve shown by Figure 8.

Figure 12 is a plan view of the lag valve as shown by Figure 8.

Figure 1:
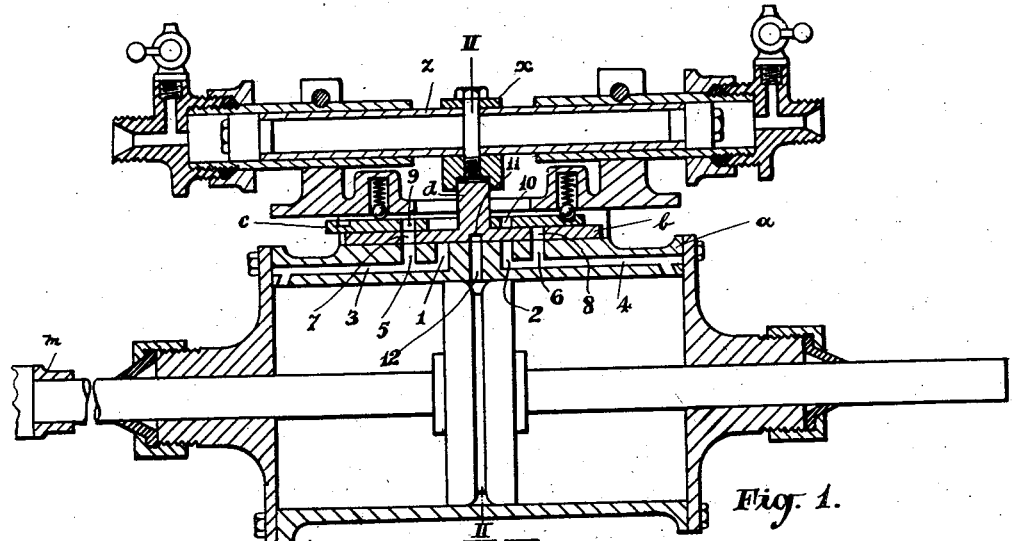
Figure 1 is a central vertical section of a portion of a remote gear control constructed according to this invention.
Figure 2:
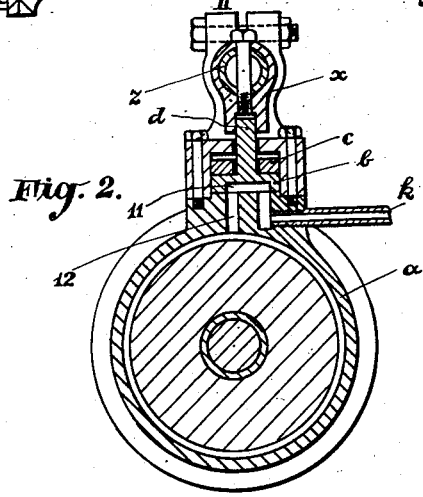
Figure 2 is a section on line II—II of Figure 1.
Figure 3:
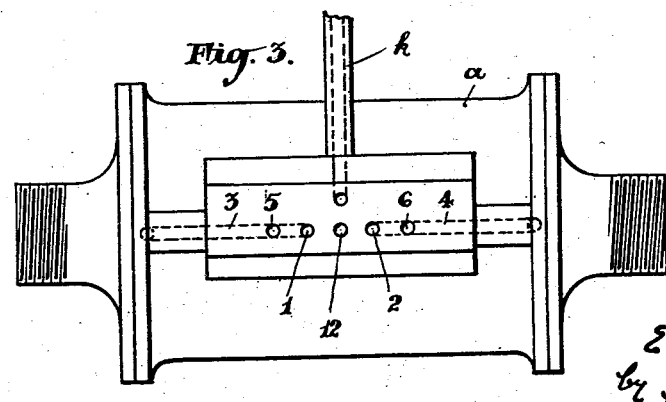
Figure 3 is a plan view of the piston cylinder showing the valve seating.
Figure 4:
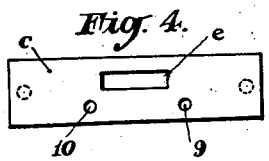
Figure 4 is an underside view of the lag valve.
Figure 5:
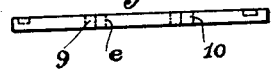
Figure 5 is a side elevation of the lag valve.
Figure 6:
Figure 6 is an underside view of the slide valve.
Figure 7:
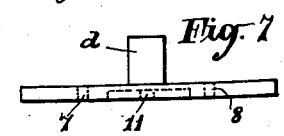
Figure 7 is a side elevation of the slide valve.
Figure 13:
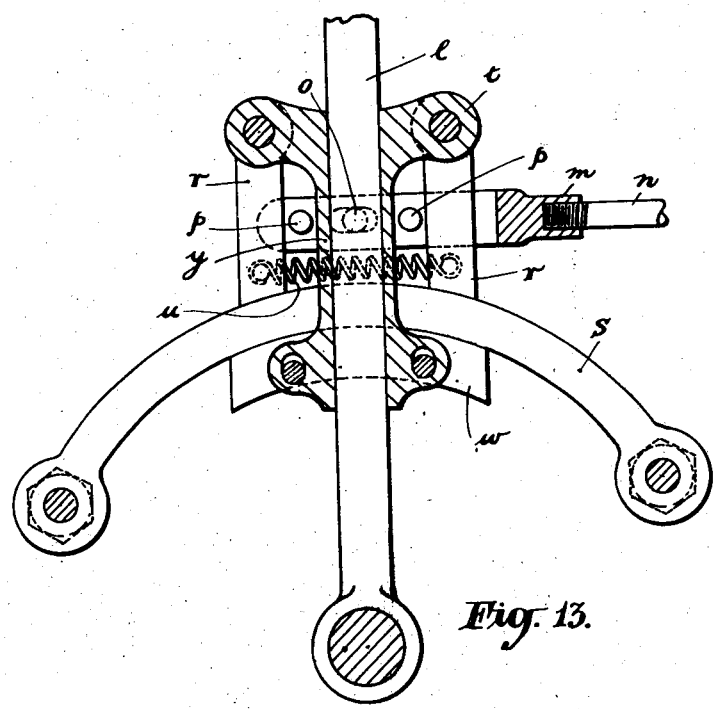
Figure 13 is a side central sectional elevation of means for locking the gear lever.
Figure 14:
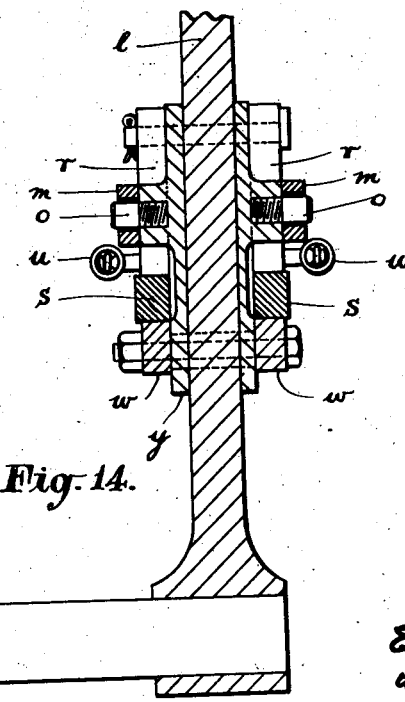
Figure 14 is a central cross sectional elevation of the locking mechanism shown by Figure 13.
Figure 15:
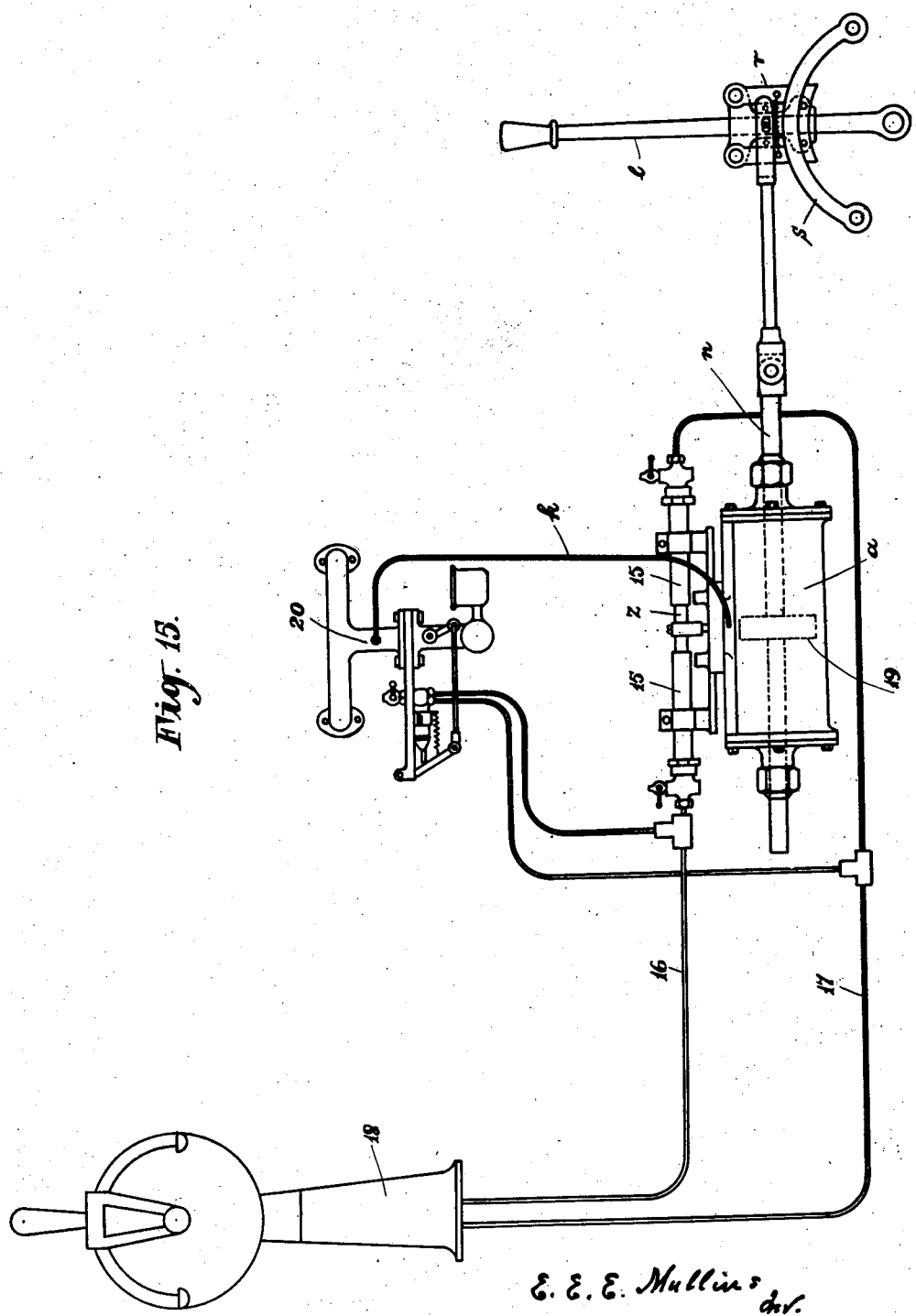
Figure 15 is a general arrangement of a device constructed according to this invention.

In the embodiment shown by Figures 1–7, the valve control unit comprises a double acting plunger Z reciprocating in the cylinders 15, the outer ends of which are connected by the conduits 16 and 17 to a double acting pump 18, so that liquid will be pumped into one cylinder 15 whilst it is being withdrawn from the other cylinder 15. The plunger Z of the valve control unit actuates a valve mechanism controlling the inlet and outlet ports of the cylinder $a$. The piston 19 and the piston rod $n$ are connected to the gear control. The piston 19 is reciprocated by means of suction, for which purpose the fluid exhaust conduit $k$ is connected to the manifold 20 of an internal combustion engine. The two outer ports 1 and 2 in the piston cylinder $a$ communicating with the conduits 3 and 4 passing respectively to each end of the cylinder are each duplicated by an outer port 5 and 6 respectively which communicate with each of said latter conduits 3 and 4, thus five ports are arranged in line. The centre port 12 of this line of ports communicates with the centre of the cylinder $a$. The valve mechanism comprises a main slide valve $b$ mounted to reciprocate on the valve seating of the cylinder $a$, in which the said five ports are formed, and a lag valve $c$ is held seated on the main valve by means of the spring pressed balls adapted to engage recesses in the lag valve to form stops at the port registering positions. The two outer ports 7 and 8 in the main slide valve $b$ constituting air inlet ports are when such valve is in the central position in register with the two outside ports 5 and 6 in the cylinder casing. The two ports 9 and 10 in the lag valve $c$ described in the prior construction are respectively also adapted to register at each end of the travel of the lag valve also with the said outside ports in the cylinder casing. The main slide valve is provided with a port 11 which is elongated at one end so that it will always be open to the fluid exhaust conduit $k$, the end of which constitutes the sixth port in the cylinder valve seating. When the suction port 11 of the main slide valve is opposite a port 1 next to the centre port 12 in the cylinder casing to suck the piston to one end of the cylinder, the air port 8 in such valve will be in register with the port 2 in the cylinder on the other side of the centre port. An air port 10 in the lag plate will also be in register with these two latter ports 8 and 2 so that air enters the cylinder on the opposite side of the piston to that to which the suction is applied. If the slide valve is moved fully across in the opposite direction, a similar arrangement of ports takes place in respect of the other side of the cylinder, and air does not enter at the centre of the cylinder, so that the piston in the suction cylinder can be moved from the positions corresponding to the forward, reverse, or in the opposite direction without having to pause in the neutral position. If the slide valve $b$ is moved into the central position, for instance with the port 11 moved from the port 1 to the port 12, suction passes through the centre port whilst air enters three registering outer ports 5, 7 and 9 in the cylinder, valve and lag plate. The main slide valve is provided with a projection $d$ and the lag valve $c$ is provided with a slot $e$ through which the projection $d$ passes. When the slide valve is thus moved, the lag valve $c$ is not moved as the projection $d$ on the valve $b$ merely slides in the slot $e$ in the lag valve. The projection $d$, as described in my said previous patent, is reciprocated by the collar $x$ on the plunger $z$ of the valve control unit. Any further movement of the valve $b$ moves the lag valve fully over. In other words the lag valve is only moved when the slide valve $b$ is moved from the central position and it always moves to the central position without moving the lag valve. By operating the double acting pump 18, the piston Z of the valve control is moved to actuate the main sliding valve $b$, to control the suction to the piston cylinder A.

According to a further embodiment of the invention as shown by Figures 8–12, in lieu of the lag valve being adapted to slide in a straight path, the main valve $b^1$ and lag valve $c^1$ are adapted to revolve around a central axis. The valve $b^1$ has a centre spindle $f$ mounted in a cover $g$ which is fixed to the piston cylinder $h^1$ through the medium of the ring $i$. The spindle $f$ carries a forked lever which is rocked by engagement with the collar $x$. This ring $i$ also encloses the valves $b^1$ and $c^1$ in a fluid tight compartment having an inlet $j$. Ports $1a$, $2a$, $5a$, $6a$ and $12b$ are provided in the face of the cylinder $h^1$ and correspond with the ports 1, 2, 5, 6 and 12 shown in Figure 3. The valve $b^1$ is provided with a projection $d^1$ and ports $7^1$, $8^1$ corresponding respectively with the projection $d$ and ports 7 and 8 of the valve $b$ previously described. This valve $b^1$ is also provided with a port $11^1$ corresponding with the port 11 previously described. In this construction, fluid is pumped through the inlet $j$ to operate the piston in the cylinder $h^1$ and the fluid is exhausted through the conduit $k^1$. The lag valve $c^1$ is provided with ports $9^1$ $10^1$ corresponding with the ports 9 and 10 of the lag valve shown by Figure 4. By rotating the valve $b^1$ fluid can pass through the ports to move the piston to either end of the piston cylinder or into a central position exactly as described in the construction shown by Figures 1 to 7. In this arrangement water, oil or other fluid effects the movement of the piston in lieu of the atmospheric pressure as in the first described embodiment. In the embodiment described in Figures 1 to 7, air is free to enter from the atmosphere. In the arrangement shown by Figures 8 to 12, the valve is enclosed so that the fluid can enter the cylinder through any set of three registering ports.

Means are provided for locking the gear lever $l$ in any position to which it has been moved. For this purpose a member $m$ on the end of the rod $n$ of the control mechanism is connected to the gear lever $l$ so that it has a small amount of play, such as by a slot and pin connection $o$. A pin $p$ is provided on each side of the member $m$ on the control rod. The end of the gear lever has two friction members $r$ mounted thereon which are adapted to engage the circular periphery of a segment $s$, and such friction members conveniently comprise pivoted arms mounted on projections $t$ on each side of the member $y$ slidably mounted on the gear lever, and these arms $r$ are pulled inwardly by means of springs $u$ so that they frictionally engage the upper surface of the segment. The member $y$ has blocks $w$ thereon which bear against a circular surface of the underside of the segment, thereby relieving pressure from the bearings of the gear lever, such blocks being adjustably mounted to take up wear. Any force applied to the gear lever will cause one or other of the pivoted friction members to bind against the segment and pull the blocks $w$ against the underside of the segment $s$. When, however, the control rod is operated one of the said pins $p$ on the link will first move against the pivoted friction member which would normally prevent movement of the gear lever, so that it will be moved out of frictional engagement with the segment thus enabling the gear lever to be moved by the continued movement of the control rod. The other or trailing friction member will freely ride over the segment.

I claim:

1. A remote control mechanism for power driven boats and the like, comprising a cylinder, a piston in the cylinder, a gear lever connected to the piston to be operated thereby, a valve mechanism combined with the cylinder for controlling the said piston to move the gear lever into "ahead", "astern" and neutral positions, and means for locking the gear lever in any of the said positions, comprising a stationary segment, a bracket slidably mounted on the gear lever, a pivoted arm carried by the bracket on each side of the gear lever and adapted to contact with the top surface of the segment, blocks carried by the bracket and adapted to be pulled against the underside of the segment by the pivoted arms, a rod moved by the said piston having a pin and slot connected to said bracket carried by the gear lever, and pins carrying said rod for moving against the said pivoted arms to release the hold on the gear lever preparatory to moving the gear lever.

2. A remote control mechanism for power driven boats and the like, comprising a cylinder with a valve seating having a set of five ports including a centre port communicating with the centre of the cylinder, two ports on each side communicating with conduits passing to each end of the cylinder, and a sixth port communicating with a fluid exhaust conduit, out of line with the said ports, a piston mounted in the cylinder and connected to a control member for moving same into "ahead", "astern" and "neutral" positions, a main valve movable on said cylinder valve seating having a centre port communicating with the said sixth port in all positions of the said valve and also having two ports on each side, a lag valve having two ports therein mounted on the main valve, and means for actuating the main valve and the lag valve so that the said ports in the cylinder valve seating, main valve and lag valve will be so arranged that an inlet for fluid can be opened in the piston cylinder at one side of the piston for actuating such piston and an outlet at the other side of the piston for exhausting the fluid from the cylinder on such side of the piston to move the control member from "ahead" position direct to "astern" position or vice-versa and also so that the piston can be moved into a "neutral" or central position from "ahead" or "astern" positions or vice-versa.

3. A remote control mechanism for power driven boats and the like, comprising a cylinder having a valve seating having a set of five ports including a centre port communicating with the centre of the cylinder, two ports on each side communicating with conduits passing to each end of the cylinder, and a sixth port, communicating with a fluid exhaust conduit, out of line with the said ports, a piston mounted in the cylinder and connected to a control member for moving same into "ahead", "astern" and "neutral" positions, a main valve movable on said seating on the cylinder and having a centre port communicating with the said sixth port in all positions of the said valve and also having two ports on each side, a lag valve having two ports therein and mounted on the main valve, a chamber enclosing the main valve and the lag valve, a conduit fitted to the wall of the chamber, and means for actuating the main slide valve and the lag valve so that the said ports in the cylinder valve seating, main valve and lag valve will be so arranged that an inlet for fluid can be opened in the piston cylinder at one side of the piston for actuating such piston and an outlet at the other side of the piston for exhausting the fluid from the cylinder on such side of the piston, to move the control member from "ahead" position direct to "astern" position or vice-versa and also so that the piston can be moved into a "neutral" or central position from "ahead" or "astern" positions or vice-versa.

ERNEST EDGAR EDWARD MULLINS.